United States Patent [19]
Allgaier et al.

[11] 3,831,972
[45] Aug. 27, 1974

[54] INFLATABLE GAS CUSHION FOR PASSENGER PROTECTION OF VEHICLES, ESPECIALLY MOTOR VEHICLES

[75] Inventors: Rudolf Allgaier, Nagold; Luigi Brambilla, Sindelfingen; Hansjurgen Scholz, Echterdingen, all of Germany

[73] Assignee: Daimler-Benz Aktiengesellschaft, Stuttgart, Germany

[22] Filed: Oct. 6, 1972

[21] Appl. No.: 295,572

[30] Foreign Application Priority Data
Oct. 8, 1971  Germany.................. 2150257

[52] U.S. Cl................... 280/150 AB, 5/348 R
[51] Int. Cl..................................... B60r 21/08
[58] Field of Search .... 280/150 AB, 150 B; 180/90; 244/121; 5/348 R

[56] References Cited
UNITED STATES PATENTS

| | | | |
|---|---|---|---|
| 3,451,694 | 6/1969 | Hass | 280/150 AB |
| 3,514,125 | 5/1970 | Nemecek | 280/150 AB |
| 3,588,140 | 6/1971 | Chute | 280/150 AB |
| 3,614,127 | 10/1971 | Glance | 280/150 AB |
| 3,614,128 | 10/1971 | Sobkow | 280/150 AB |
| 3,617,073 | 11/1971 | Landsman | 280/150 AB |
| 3,642,303 | 2/1972 | Irish | 280/150 AB |
| 3,650,223 | 3/1972 | Koburi | 280/150 AB |
| 3,727,942 | 4/1973 | Arntson | 280/150 AB |

Primary Examiner—David Schonberg
Assistant Examiner—John P. Silverstrim
Attorney, Agent, or Firm—Craig & Antonelli

[57] ABSTRACT

An inflatable gas cushion for the protection of the passengers of vehicles, especially of motor vehicles, in which the side of the inflatable gas cushion facing the user is constructed offset step-shaped in such a manner that an impact surface for the head of the user which is formed thereby is essentially horizontal or only slightly inclined with respect to the horizontal when the gas cushion is inflated.

4 Claims, 1 Drawing Figure

PATENTED AUG 27 1974     3,831,972
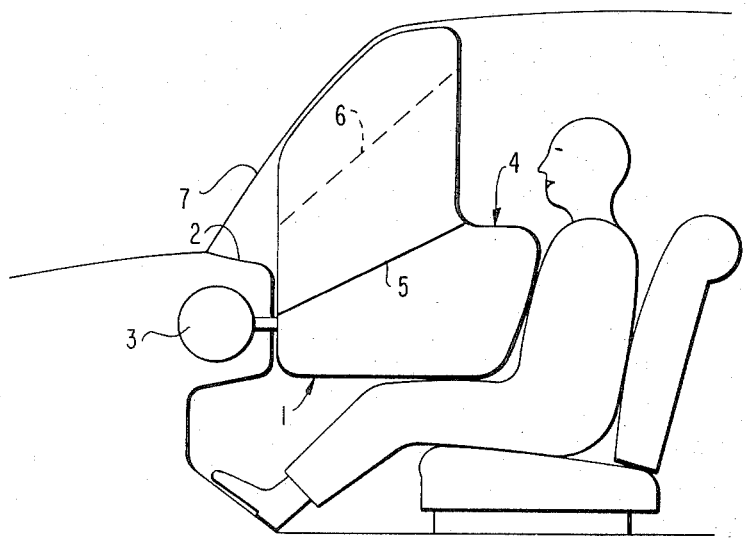

INFLATABLE GAS CUSHION FOR PASSENGER PROTECTION OF VEHICLES, ESPECIALLY MOTOR VEHICLES

The present invention relates to an inflatable gas cushion for the protection of the passengers of vehicles, especially of motor vehicles, which is automatically inflated when exceeding a certain predetermined deceleration of the vehicle.

The gas cushions of this type which are known heretofore are so constructed that their side facing the vehicle passengers to be protected has a convex curvature whereby—as experiments have clearly indicated—an undesired relative movement between head and body occurs during the impact of the vehicle passenger against the gas cushion, and more particularly a bending off or snapping of the head toward the rear which may be the cause of serious vertebrae or spinal injuries.

The present invention is therefore concerned with the task to avoid this disadvantage of the prior art gas cushions and to so construct a gas cushion that a bending off or snapping of the head of a vehicle passenger toward the rear is practically precluded during the impact against the gas cushion.

Accordingly, an inflatable gas cushion for the protection of the passengers of vehicles, especially of motor vehicles is proposed whereby according to the present invention the side of the gas cushion facing the user is constructed offset step-shaped in such a manner that with an inflated gas cushion an essentially horizontal impact surface or an impact surface only slightly inclined with respect to the horizontal is formed for the head.

According to a preferred embodiment of the present invention, at least one band, tape or the like extending on the inside of the gas cushion is provided for the better form maintenance of the step, whose one end is connected within the area of the step with the gas cushion and whose other end is connected with a part fixed with the vehicle.

In order not to permit any forces not acting in the vehicle longitudinal direction to act on a vehicle passenger during the impact of the vehicle passenger on such a gas cushion, it is proposed according to a further feature of the present invention to so construct the gas cushion that its side opposite the user is so shaped that it adapts itself to the contour of the windshield. It is achieved thereby that in case of an impact, no transverse forces act on the passengers and a central rebound or recoiling action of the head against a headrest takes place.

Accordingly, it is an object of the present invention to provide an inflatable gas cushion for the protection of the passengers of motor vehicles which avoids by simple means the aforementioned shortcomings and drawbacks encountered in the prior art.

Another object of the present invention resides in an inflatable gas cushion for the protection of vehicle passengers which effectively prevents any undesirable relative movements between head and torso of the passenger during impact of the passenger against the gas cushion.

A further object of the present invention resides in an inflatable gas cushion of the type described above which minimizes the danger for serious spinal injuries as a result of the impact of the head of the passenger against the gas cushion.

Still another object of the present invention resides in a gas cushion for the protection of vehicle passengers which not only effectively achieves all of the aforementioned aims and objects but additionally precludes the interaction of transverse forces on the passenger during the impact.

These and further objects, features and advantages of the present invention will become more apparent from the following description when taken in connection with the accompanying drawing which shows, for purposes of illustration only, one embodiment in accordance with the present invention, and wherein:

The single FIGURE is a schematic side view of an arrangement of a gas cushion constructed in accordance with the present invention which is arranged in front of the co-driver seat of a passenger motor vehicle.

Referring now to the single FIGURE of the drawing, the gas cushion generally designated by reference numeral 1 is thereby secured at the instrument panel 2 of the vehicle and can be filled in case of need by a gas generator 3 of any conventional construction. On its side facing the vehicle passenger, the gas cushion 1 is constructed offset step-shaped so that practically an "immersion recess" and an essentially horizontally disposed impact surface 4 for the head of the passenger is formed thereby. In order to increase the form rigidity of the step, a strap or tension band 5 of any conventional type is provided on the inside of the gas cushion 1 which at its end opposite the step is secured at the gas generator 3. Reference numeral 6 designates in the drawing the rear edge (not visible) of the gas cushion 1 matched to the contour of the windshield 7.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A safety arrangement for the protection of passengers of vehicles, especially of motor vehicles including a windshield, the arrangement comprising: an inflatable gas cushion, means for inflating said gas cushion upon exceeding a predetermined deceleration, said gas cushion in the inflated position having a protective surface facing the vehicle passenger which is offset step-shaped in configuration, said protective surface including a pair of spaced vertically extending surface portions and a substantially horizontally extending surface portion defining an impact surface for the head of the vehicle passenger, said gas cushion including a further surface portion disposed opposite said protective surface adapted to match the contour of the vehicle windshield, and a band means disposed within said gas cushion for increasing the form rigidity of said impact surface.

2. A safety arrangement according to claim 1, wherein the vehicle includes a relatively fixed vehicle part and wherein one end of said band means is connected with the gas cushion within the area of said impact surface and the other end is connected with the relatively fixed vehicle part.

3. A safety arrangement according to claim 2, wherein said inflating means is disposed on the relatively fixed vehicle part, said other end of said band means being connected with said inflating means.

4. A safety arrangement according to claim 3, wherein said inflating means is a gas generator for inflating said inflatable cushion.

* * * * *